United States Patent Office 3,242,175
Patented Mar. 22, 1966

3,242,175
HYDROXYPHENYL-1,3,5-TRIAZINES
Max Duennenberger, Frenkendorf, Basel-Land, Hans Rudolf Biland, Basel, and Christian Luethi, Muenchenstein, Switzerland, assignors to Ciba Limited, Basel, Switzerland, a Swiss company
No Drawing. Filed Oct. 28, 1963, Ser. No. 319,569
Claims priority, application Switzerland, Oct. 30, 1962, 12,744/62
5 Claims. (Cl. 260—248)

The present invention refers to new, valuable hydroxyphenyl-1,3,5-triazines which, like for instance the compound of the formula (1)
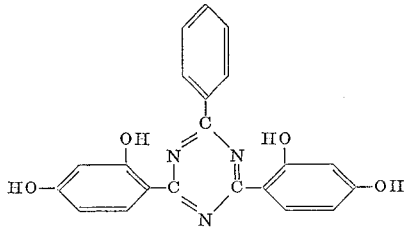

correspond to the general formula (2)
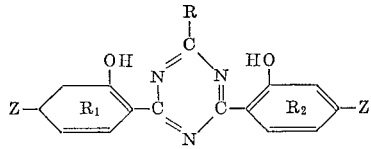

in which R represents a benzene radical directly linked to the triazine ring with one ring carbon atom, and Z stands for a hydroxyl group or an alkoxy group with not more than 12 carbon atoms, only the radicals $R_1$ and $R_2$ having oxygen-containing substituents.

The benzene radical R in the above shown general Formula 2 does not include oxygen-containing substituents, for instance hydroxyl groups or etherified hydroxyl groups. It may even be entirely free from other substituents, i.e. it may represent the phenyl group (3)
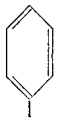

or it may comprise substituents which do not contain oxygen, for instance alkyl groups with, for instance, 1 to 4 carbon atoms like methyl, ethyl, ispropyl and tert-butyl, alkylphenyl groups, phenylalkyl groups, also cyclohexyl groups and halogen atoms like fluorines or chlorine.

Among the new hydroxyphenyl-1,3,5-triazines of the general Formula 2 those may be mentioned, for example, which correspond with the general formula (4)
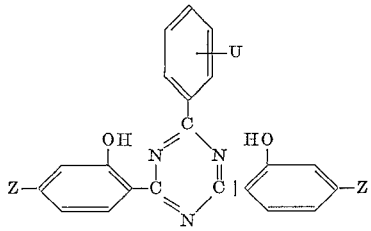

in which U represents a hydrogen atom, a halogen atom like, in particular, chlorine, an alkyl group with 1 to 4 carbon atoms or a phenyl group, and Z stands for a hydroxyl group or an alkoxy group with not more than 12 carbon atoms, and, among these hydroxyphenyl-1,3,5-triazines of the Forumal 4, may be mentioned in particular those of the formula (5)
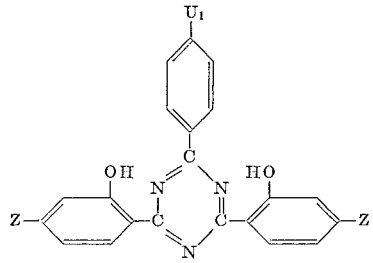

in which $U_1$ represents a hydrogen atom or an alkyl group with 1 to 4 carbon atoms, and Z has the meaning explained in connection with Formulae 2 and 4.

The new hydroxyphenyl-1,3,5-triazines of the above mentioned Formula 2 are obtainable by known methods, for instance by reacting in a water-free medium in the presence of Friedel-Crafts catalysts like, in particular, aluminum chloride, 1 mol of a dichloro-1,3,5-triazine of the formula (6)
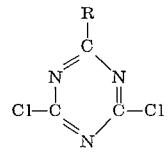

in which R represents a benzene radical, directly linked with the ring carbon atom to the triazine ring, and free from oxygen-containing substituents, with 2 mols of a compound of the formula (7)
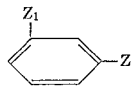

in which Z and $Z_1$ each stand for a hydroxyl group or an alkoxy group with not more than 12 carbon atoms.

The dichloro-1,3,5-triazines of Formula 6 are either known or can be produced by known methods.

As examples of compounds of Formula 7 may be mentioned:

1,3-dihydroxy-benzene
1-hydroxy-3-methoxy-benzene
1-hydroxy-3-ethoxy-benzene
1,3-dimethoxy-benzene
1,3-diethoxy-benzene If in the above described treatment one uses as starting materials for the transformation with the dichloro-1,3,5-triazines of Formula 6 compounds of Formula 7 in which Z or $Z_1$ both represent alkoxy groups of the kind mentioned, the reaction, particularly at elevated temperatures, will split the etherified hydroxyl group ($Z_1$) which occupies an ortho-position to the link which forms to the triazine ring, thus producing also from these starting materials hydroxyphenyl-1,3,5-triazines of Formula 2.

Hydroxyphenyl-1,3,5-triazines of Formula 2 with such hydroxy-benzene radicals, which have in ortho-position to the link with the triazine ring a hydroxyl group, and in para-position to it an etherified hydroxyl group, may also be obtained from hydroxyphenyl-1,3,5-triazines with hydroxybenzene radicals in which the ortho- as well as the para-position to the link with the triazine ring carry a (non-etherified) hydroxyl group, by subsequently etherifying the hydroxy group occupying the para-position by known methods with suitable alkylhalides like, for instance, n-propyl, n-octyl- and dodecylbromides, or with dialkylsulfates like diethylsulfate.

The new hydroxyphenyl-1,3,5-triazines of the described composition may be used as stabilizing agents for various organic materials, in particular as a protection against ultra-violet radiation.

The present invention, consequently, includes within its scope also a method for the protection of organic materials against the damaging effects of heat, air and, in particular, ultra-violet radiation by utilizing the new hydroxyphenyl-1,3,5-triazines of Formula 2.

Basically, three different applications can be recognized which may be utilized separately or combined:

(A) The stabilizing agent, in particular if protecting against light, is incorporated in a substrate to protect this substrate against attack from ultra-violet rays, whereby alteration in one or more physical properties like, for instance, discoloration, change in tear resistance, brittleness etc. and/or chemical reactions caused by ultra-violet rays like, for instance, oxidation processes, are prevented. The incorporation may take place before or during the production of the substrate, or subsequently by a suitable method, for instance a fixation process, similar to a dyeing operation.

(B) The agent protecting against light is incorporated in a substrate in order to protect one or more substances contained in the substrate like, for instance, dyes, ancillary ingredients etc. The substrate protection mentioned in (A) may take place simultaneously.

(C) The agent for protection against light is incorporated in a "filter layer" to protect a substrate located either directly below it or at some distance (for instance in a shop window) against attack from ultra-violet rays; the filter layer may be solid (film, foil, dressing) or semi-solid (cream, oil, wax).

The method of protecting organic materials against the damaging effects of heat, air and, in particular, ultra-violet radiation, consequently, is characterized by incorporating the new hydroxyphenyl-1,3,5-triazines of Formula 2 either in the organic material to be protected or in a substrate contained in this material, or in a filter layer imposed on the material to be protected or by fixing it to such materials.

Among organic materials which can be protected may be mentioned:

(a) Textiles in general, comprising any form like fibers, threads, yarn, woven or knitted goods or felt and all products made from them. Such textiles may consist of natural products of animal origin like wool and silk, or of vegetable original like cellulose materials from cotton, hemp, flax, linen, jute and ramie, and furthermore, from semi-synthetic materials like regenerated cellulose, for instance artificial silk, viscoses including rayon staple, or synthetic materials produced by polymerization or copolymerization, for instance of polyacrylonitrile, polyvinylchloride or polyolefines like polyethylene and polypropylene, or those obtained by polycondensation like polyesters and, particularly, polyamides. In the case of semi-synthetic materials it is advisable to add the protecting agents to the spinning mass, for instance viscose-spinning mass, acetylcellulose-spinning mass (including cellulose triacetate), and in the case of materials for the production of entirely synthetic fibers like fused polyamides or polyacrylonitrile spinning masses to add these agents before, during or after polycondensation or polymerization, respectively.

(b) Fibers of a different kind which are not textiles and which may be of animal origin like feathers, hair, and also hides and skins and the leather obtained from them by natural or chemical tanning, as well as products made from them; furthermore those of vegetable origin like straw, wood, wood pulp or materials consisting of compressed fibers like paper, cardboard or hardboard and materials made from them, also materials used for paper production (for instance Hollander pulp).

(c) Materials for coatings and dressings for textiles and paper, for instance those based on starch or casein or those based on plastics, for instance vinyl acetate or derivatives of acrylic acid.

(d) Lacquers and films of various composition, for instance those from acetylcellulose, cellulose propionate, cellulose butyrate and cellulose mixtures like, for instance, cellulose acetatebutyrate and cellulose acetatepropionate, nitrocellulose, vinylacetate, polyvinylchloride, polyvinylidenechloride, copolymers from vinylchloride and vinylidenechloride, alkyd lacquers, polyethylene, polypropylene, polyamides, polyacrylonitrile, polyesters, etc. A further application of the hydroxyphenyl-1,3,5-triazines is their incorporation into packing materials, in particular the known transparent foils from regenerated cellulose (viscose) or acetylcellulose. In this case it is as a rule advisable to add the protecting agent to the material from which these foils are produced.

(e) Natural and artificial resins, for instance epoxy resins, polyester resins, vinyl resins, polystyrene resins, alkyd resins, aldehyde resins like phenol-urea-, or melamine-formaldehyde condensation products, as well as emulsions from artificial resins (for instance, oil in water or water in oil emulsions). In this case the protecting agent may be suitably added before or during the polymerization or polycondensation. Artificial resins reinforced with glass fiber may also be mentioned, and laminates made from them.

(f) Hydrophobic oil-, fat- or wax-containing materials, like candles, floor polish, floor stains or other wood stains, furniture polish, in particular those for treatment of light or bleached wooden surfaces.

(g) Natural materials of the caoutchouc type like rubber, latex, balata, gutta-percha or synthetic materials suitable for vulcanizing, like polychloroprene, olefinic polysulfides, polybutadiene or copolymers from butadienestyrene (for instance Buna S) or butadiene acrylonitrile (for instance Buna N) which may also contain fillers, pigments, or vulcanizing agents and in which the addition of hydroxyphenyl-1,3,5-triazines delays ageing and thereby prevents alteration in elasticity and brittleness.

(h) Cosmetic preparations like perfumes, dyed and undyed soaps and bath salts, skin and face creams, powder, repellants, in particular sun-protection oils and creams.

Obviously the hydroxyphenyl-1,3,5-triazines are suitable protecting agents not only for undyed but also for dyed or pigmented materials. In this case the protection extends to the dyes, thus resulting in some cases in considerable improvement of light fastness. If desired, treatment with the protecting agent and dyeing or pigmenting process may be combined.

According to the kind of material to be treated, requirements in regard to efficiency and life and other circumstances, the quantities of the stabilizing agent, in particular of the light protecting agent to be incorporated in the material, may vary within wide limits, for instance approx. 0.01 to 10%, preferably 0.1 to 2%, of the material which has to be protected against the damaging effect of heat, air and, in particular, ultra-violet radiation.

In the following examples the parts are by weight and the percentages, weight percentages unless otherwise specified.

*Example 1*

66 parts of 1,3-dihydroxybenzene and 45 parts of phenyl 4,6-dichloro-1,3,5-triazine are dissolved in 400 parts of nitrobenzene. 42 parts of anhydrous aluminum chloride are now added rapidly while cooling with ice and stirring, so that the temperature does not exceed 20° C. Subsequently the temperature is increased during 30 minutes to 90° C. to 95° C. and stirring is continued at this temperature. The dark red solution is then decomposed with a mixture of 1000 parts of water, 900 parts of ice and 100 parts of conc. hydrochloric acid. The water is decanted from the nitrobenzene layer until it is neutral. Then the mixture is subjected to steam distillation and the precipitate left in the distillation flask is suction-filtered, giving the product of formula (1)

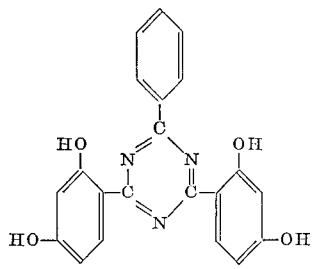

After drying, 80 to 85 parts of yellow crystals are obtained. After two re-crystallizations from dimethyl-formamide-water, the yellow needles produce the following analysis results.

Analysis ($C_{21}H_{15}O_4N_3$): M.P. >300° C. Calculated: C, 67.55%; H, 4.05%; N, 11.26%. Obtained: C, 67.07%; H, 4.13%; N, 11.55%.

*Example 2*

If in Example 1 the 2-phenyl-4,6-dichloro-1,3,5-triazine is replaced by the corresponding 2-(p-tert.-butyl)phenyl-4,6-dichloro-1,3,5-triazine or 2-(p-chloro)phenyl-4,6-dichloro-1,3,5-triazine or 2-(p-methyl)phenyl-4,6-dichloro-1,3,5-triazine or 2-(p-phenyl)phenyl-4,6-dichloro-1,3,5-triazine, one obtains by analogous treatment the corresponding hydroxyphenyl-1,3,5-triazines of the formulae (8)

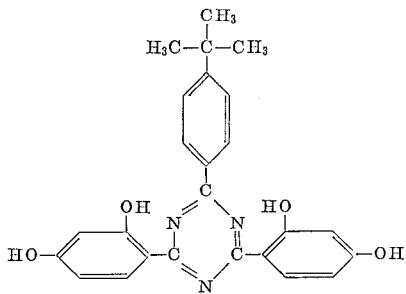

Analysis ($C_{25}H_{23}O_4N_3$): M.P. >300° C. Calculated: C, 69.91%; H, 5.40%; N, 9.79%. Obtained: C, 69.72%; H, 5.57%; N, 9.97%.

(9)

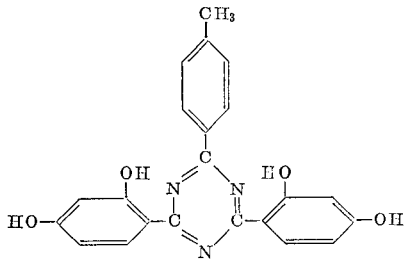

Analysis ($C_{22}H_{17}O_4N_3$): M.P. >300° C. Calculated: C, 68.21%; H, 4.42%; N, 10.85%. Obtained: C, 68.42%; H, 4.70%; N, 10.89%.

(10)

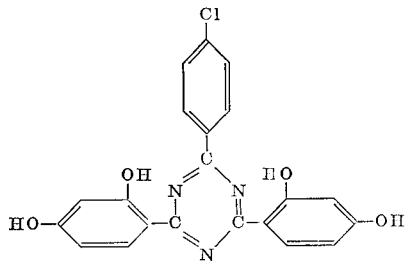

M.P. >300° C.

(11)

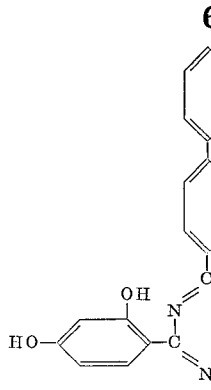

M.P. >300° C.

*Example 3*

7.4 parts of the compound of Formula 1, the production of which is described in Example 1 are dissolved at 65 to 70° C. in 100 parts of dimethylformamide, 2 parts of sodium hydroxide in 10 parts of water and 20 parts of 2 N-sodium carbonate solution. 6.2 parts of diethylsulfate are then added drop by drop to the solution while stirring and subsequently maintaining constant temperature for 2 hours. Then 300 parts of 5% aqueous hydrochloric acid are added thus precipitating the product of formula (12)

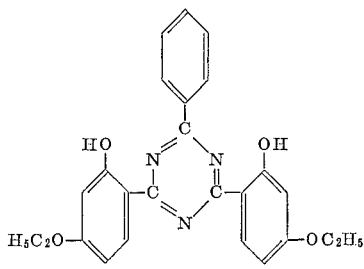

in the form of light yellow crystals. After three recrystallizations from dimethylformamide-alcohol the analysis product melts at 233° to 234° C.

Analysis ($C_{25}H_{23}O_4N_3$): Calculated: C, 69.91%; H, 5.40%; N, 9.79%. Obtained: C, 69.91%; H, 5.24%; N, 9.73%.

*Example 4*

37 parts of the compound of Formula 1 are dissolved in 300 parts of dimethylformamide which contains 10 parts of sodium hydroxide. Then 8 parts of n-propyl bromide are dropped in within 1 hour at 70° to 75° C. while stirring. Stirring is continued at the same temperature for another 2 hours and subsequently the mixture is poured into 1000 parts of 5% aqueous hydrochloric acid, and suction-filtered. The residue is washed until it is neutral and dried at 70° to 80° C. in vacuo. In this way one obtains about 40 parts of the compound of formula (13)

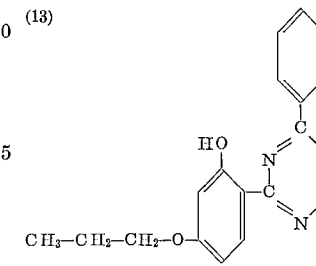

After three recrystallizations from benzene-methanol the product of the analysis melts at 174° to 175° C.

Analysis ($C_{27}H_{27}O_4N_3$): Calculated: C, 70.88%; H, 5.95%; N, 9.19%. Obtained: C, 71.00%; H, 5.76%; N, 9.17%.

Example 5

If in Example 4 the n-propylbromide is replaced by the corresponding quantity of n-butylbromide one obtains the product of formula (14)

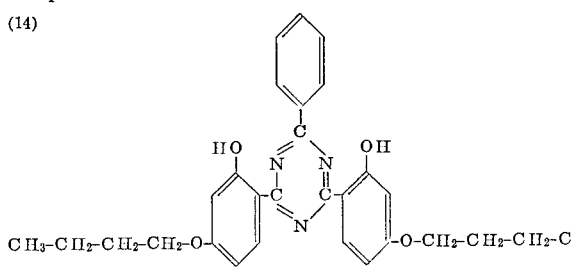

in similar purity and yield.

Analysis ($C_{29}H_{31}O_4N_3$): M.P. 169° to 170° C. Calculated: C, 71.42%; H, 6.44%; N, 8.65%. Obtained: C, 71.66%; H, 6.43%; N, 8.51%.

Example 6

If in Example 4 the n-propylbromide is replaced by the corresponding quantity of n-octylbromide or n-dodecylbromide, one obtains the corresponding ethers of formulae (15)

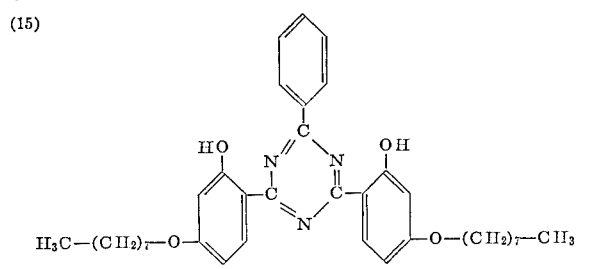

Analysis ($C_{37}H_{47}O_4N_3$): M.P. 112° to 113° C. Calculated: C, 73.34%; H, 7.93%; N, 7.01%. Obtained: C, 74.54%; H, 7.85%; N, 6.96%; and (16)

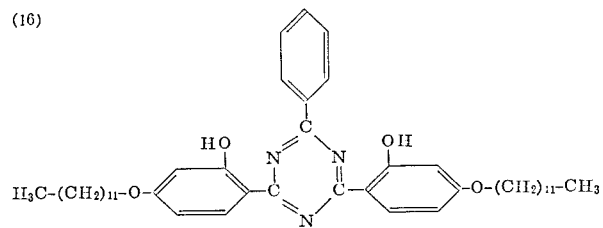

Analysis ($C_{45}H_{63}O_4N_3$): M.P. 105.5° to 106° C. Calculated: C, 76.12%; H, 8.94%; N, 5.82%. Obtained: C, 75.81%; H, 8.87%; N, 5.87%.

Example 7

If one converts the compound of Formula 8 in Example 2 in a manner similar to that described in Example 3 with diethylsulfate or that described in Example 4 with n-propylbromide or n-octylbromide, one obtains the following ethers of the formulae (17)

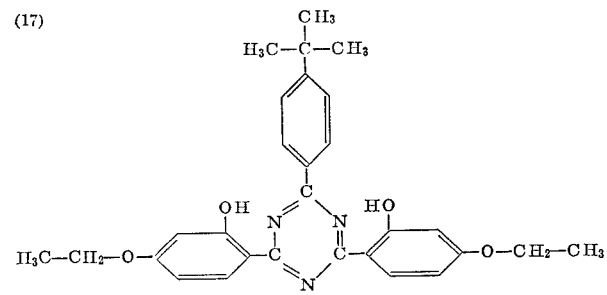

Analysis ($C_{29}H_{31}O_4N_3$): M.P. 183.5° to 184° C. Calculated: C, 71.72%; H, 6.44%; N, 8.65%. Obtained: C, 71.82%; H, 6.62%; N, 8.67%.

(18)

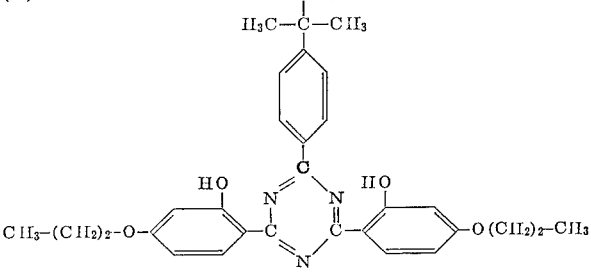

Analysis ($C_{31}H_{35}O_4N_3$): M.P. 178° to 179° C. Calculated: C, 72.49%; H, 6.87%; N, 8.18%. Obtained: C, 72.62%; H, 6.85%; N, 8.42%.

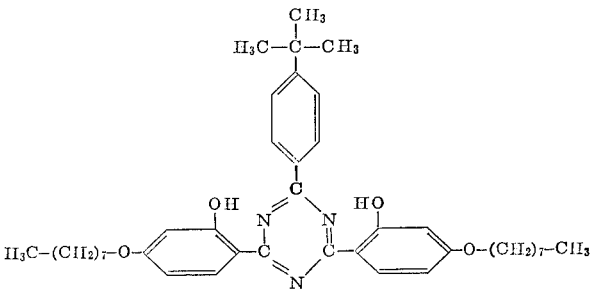

Analysis ($C_{41}H_{55}O_4N_3$): M.P. 132.5° to 133° C. Calculated: C, 75.31%; H, 8.48%; N, 6.43%. Obtained: C, 75.39%; H, 8.63%; N, 6.63%.

Example 8

From a 10% solution in acetone of acetyl cellulose containing, based on acetyl cellulose, 1% of the compound of Formula 1 a film of approx. 40µ thickness is produced. After drying the following data are obtained for the light transmission in percent:

| Wavelength in mµ | Light transmission in percent | |
|---|---|---|
| | Unexposed | Exposed (100 hrs. Fadeometer) |
| 280 to 375 | 0 | 0 |
| 380 | 5 | 5 |
| 390 | 33 | 33 |
| 400 | 65 | 65 |

Similar results were obtained with the compounds of the Formula 8, 9 or 12.

Example 9

10.000 parts of polyamide chips, produced by a known method from hexamethylenediamineadipate are mixed in a rotating vessel for 12 hours with 30 parts of titanium dioxide (rutile-modification) and 50 parts of the compound of Formula 1, 8, 9, 12, 13, 14, 15 or 16. The chips thus treated are melted in a boiler from which the atmospheric oxygen has been displaced by superheated steam and which is maintained by means of oil heating at 300 to 310° C., and the melt is stirred for ½ hour. The molten mass is then pressed out through a spinneret by nitrogen pressure of 5 atm. and the resulting, cooled filament is wound upon a spinning bobbin. The tensile strength of the threads produced is, after stretching, far less reduced by light than those produced in the same way but without the addition of the compound of Formula 1, 8, 9, 12, 13, 14, 15 or 16.

Example 10

A paste made of 100 parts of polyvinyl chloride, 59 parts by volume of dioctyl phthalate and 0.2 part of the compound of Formula 1 is rolled out to a foil on the calender at 150° to 155° C. The polyvinyl chloride foil thus produced absorbs completely in the ultra-violet range of 280 to 360 mμ.

In place of the compound of Formula 1, one of the compounds of Formula 14, 15, 17 or 18 may be used.

Example 11

1.0 part of the compound of Formula 1 is dissolved in 100 parts by volume of 3% sodium hydroxide solution and 100 parts by volume of ethanol. Then 3000 parts of water and 3 parts of an aqueous solution of the addition product of 35 mols ethylene oxide to 1 mol of stearyl alcohol are added. The solution thus obtained is neutralized with 10% sulfuric acid with potentiometer control until the pH value is 7, thus forming a fine dispersion. Into this bath are placed at room temperature, 100 parts of a fabric made from polyamide fibers, produced from hexamethylenediamine and adipic acid. The mixture is heated slowly to boiling point and treated at the same temperature for another hour. Then the fabric is removed from the bath, rinsed in cold water and dried.

The fabric treated in this way shows after 100 hours' exposure to a xenon lamp much less reduction of tensile strength than it would without the addition of the compound of Formula 1.

Similarly favorable results are obtained if in place of the compound of Formula 1 a compound of Formula 14, 15, or 18 is used.

Example 12

Paper pulp is produced in a Hollander, consisting of 150 parts of bleached sulfite or sulfate cellulose
66 parts of zinc sulfide
6 parts of aluminum sulfate
3 parts of a finely dispersed aqueous paste which contains 30% of the azo pigment of the formula

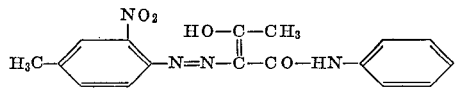

and 5000 parts of water.

The decorative paper produced from this matter is introduced with untreated tissue- or overlay paper into a bath made up from:

100 parts of a pulverized, hardenable, water-soluble condensation product from 1 mol of melamine and about 2 mols of formaldehyde, and
100 parts of a mixture consisting of a solution of 0.5 part of the compound of Formula 1, 9, 12 or 15 in 19.5 parts of dimethylformamide, diluted with 80 parts of water.

After removal of the excess resin solution the paper is dried.

The decorative paper treated in this way is pressed together with the treated tissue paper which serves as cover, to a base consisting of a layer of phenolic paper and intermediate, melamine-resin impregnated sheets for 10 minutes at 140° to 150° C. and 100 kg./sq. cm. pressure.

The laminate produced registers on the Fadeometer after exposure considerably better light fastness than one without the compound of Formula 1, 9, 12 or 15.

Example 13

A mixture of 100 parts polyethylene "Alkathene WNG–14") and 0.2 part of one of the compounds of the Formulas 1 and 12 to 19 is rolled out on the calender to a foil at 130° to 140° C. and pressed at 130° C.

The polyethylene foil thus produced is practically impervious to ultra-violet light in the range of 280 to 380 mμ.

Similar results are obtained using polypropylene in place of polyethylene.

What we claim is:
1. A hydroxphenyl-1,3,5-triazine of the formula

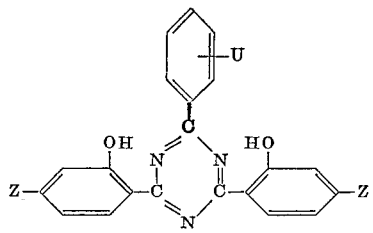

wherein U is a member selected from the group consisting of hydrogen, halogen, phenyl and lower alkyl and Z is a member selected from the group consisting of hydroxy and alkoxy.

2. The compound of formula

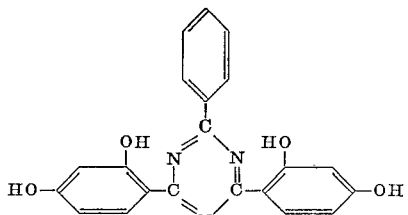

3. The compound of formula

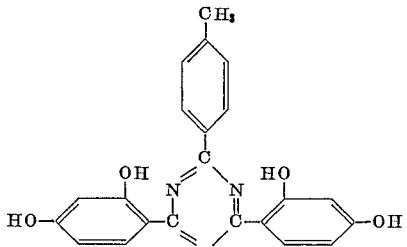

4. The compound of formula

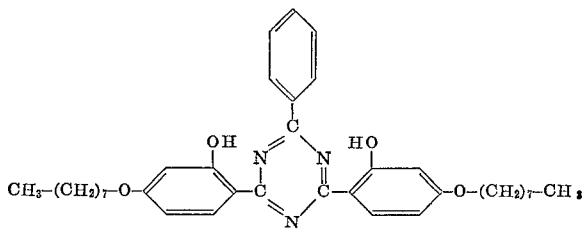

5. The compound of formula

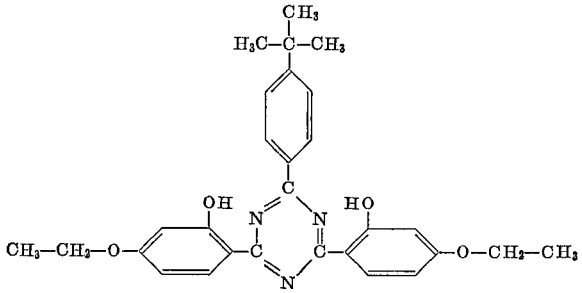

References Cited by the Examiner

UNITED STATES PATENTS

| | | | |
|---|---|---|---|
| 3,113,942 | 12/1963 | Johns et al. | 260—248 |
| 3,113,943 | 12/1963 | Johns et al. | 260—248 |
| 3,118,887 | 1/1964 | Hardy et al. | 260—248 |

WALTER A. MODANCE, *Primary Examiner.*

NICHOLAS S. RIZZO, MARION W. WESTERN,
*Assistant Examiners.*